(12) United States Patent
Sun et al.

(10) Patent No.: US 12,453,719 B2
(45) Date of Patent: Oct. 28, 2025

(54) TREATMENT METHOD USING A COMPLEX OF ANGIOTENSIN II RECEPTOR ANTAGONIST METABOLITE AND NEP INHIBITOR

(71) Applicant: Shenzhen Salubris Pharmaceuticals Co., Ltd., Guangdong (CN)

(72) Inventors: Jingchao Sun, Guangdong (CN); Sirao Yang, Guangdong (CN); Lei Li, Guangdong (CN); Yue Yang, Guangdong (CN); Xuege Shen, Guangdong (CN); Wei Lin, Guangdong (CN); Shiying He, Guangdong (CN); Ji Chen, Guangdong (CN)

(73) Assignee: Shenzhen Salubris Pharmaceuticals Co., Ltd., Guangdong (CN)

( * ) Notice: Subject to any disclaimer, the term of this patent is extended or adjusted under 35 U.S.C. 154(b) by 962 days.

(21) Appl. No.: 17/615,013

(22) PCT Filed: May 26, 2020

(86) PCT No.: PCT/CN2020/092264
§ 371 (c)(1),
(2) Date: Nov. 29, 2021

(87) PCT Pub. No.: WO2020/238885
PCT Pub. Date: Dec. 3, 2020

(65) Prior Publication Data
US 2022/0226285 A1    Jul. 21, 2022

(30) Foreign Application Priority Data

May 30, 2019    (CN) .......................... 201910462208.8
Apr. 23, 2020   (CN) .......................... 202010327793.3

(51) Int. Cl.
*A61K 31/41*    (2006.01)
*A61P 9/04*     (2006.01)

(52) U.S. Cl.
CPC ................ *A61K 31/41* (2013.01); *A61P 9/04* (2018.01)

(58) Field of Classification Search
None
See application file for complete search history.

(56) References Cited

FOREIGN PATENT DOCUMENTS

| AU | 2017209250 | * 7/2017 | ........... A61K 31/197 |
|---|---|---|---|
| CN | 101098689 A | 1/2008 | |
| CN | 104826115 A | 8/2015 | |
| CN | 105669581 A | 6/2016 | |
| CN | 105960398 A | 9/2016 | |
| CN | 105963296 A | 9/2016 | |
| CN | 106138041 A | 11/2016 | |
| CN | 106146472 A | 11/2016 | |
| WO | WO 2007056546 A1 | 5/2007 | |
| WO | WO 2017125031 A1 | 7/2017 | |

OTHER PUBLICATIONS

International Search Report in corresponding PCT Application No. PCT/CN2020/092264, mailed Aug. 24, 2020.
Tamaki et al., "EXP3174: The Major Active Metabolite of Losartan," Cardiovascular Drug Reviews, 1997, vol. 15. No. 2, pp. 122-136.
Wang et al., "Effects of Sacubitril/Valsartan (LCZ696) on Natriuresis, Diuresis, Blood Pressures, and NT-proBNP in Salt-Sensitive Hypertension," Hypertension, 2017, 69(1), pp. 32-41.

* cited by examiner

*Primary Examiner* — Paul V Ward
(74) *Attorney, Agent, or Firm* — Leason Ellis LLP (57) ABSTRACT

The present application belongs to the technical field of drug application, relates to a treatment method using a complex of an angiotensin II receptor antagonist metabolite and an NEP inhibitor, and specifically relates to the dosage of the drug.

13 Claims, 1 Drawing Sheet

TREATMENT METHOD USING A COMPLEX OF ANGIOTENSIN II RECEPTOR ANTAGONIST METABOLITE AND NEP INHIBITOR

CROSS-REFERENCE TO RELATED PATENT APPLICATIONS

This application is a U.S. National Phase Application under 35 U.S.C. § 371 of International Patent Application No. PCT/CN2020/092264, filed May 26, 2020, and claims the priority of Chinese Application No. 201910462208.8, filed May 30, 2019 and Chinese Application No. 202010327793.3, filed Apr. 23, 2020, all of which are incorporated by reference in their intireties. The International Application was published on Dec. 3, 2020 as International Publication No. WO 2020/238885 A1.

FIELD OF THE INVENTION

The present invention belongs to the technical field of drug applications, relates to a treatment method of a complex of an angiotensin II receptor antagonist metabolite and an NEP inhibitor, specifically relates to the administration of an appropriate dosage of the complex to a patient, and more specifically, relates to a treatment method of the complex for hypertension or chronic heart failure.

DESCRIPTION OF THE RELATED ART

Hypertension is a clinical syndrome with increased systemic arterial pressure as the primary manifestation, and is the most common cardiovascular disease. In most cases, the onset of hypertension is slow, and there is no special clinical manifestation. As a result, the diagnosis is delayed, and it is only found during blood pressure measurement or when there is a complication with the heart, brain, or kidney. There is a close cause and effect relationship between long-term hypertension and risks of onset and death of cardiovascular and cerebrovascular diseases.

According to the statistics, more than one billion people across the world have uncontrolled hypertension at present, which is expected to increase to 1.5 billion in 2030. In China, results from the China Hypertension Survey (CHS) from 2012 to 2015 show that the morbidity rate of hypertension in adults ≥18 years old is 27.9% (23.2% weighted), the awareness rate, the treatment rate, and the control rate are 51.6%, 45.8%, and 16.8%, respectively, and the treatment control rate is 37.5%. The morbidity rate of hypertension appears to have a continuously ascending trend. According to the statistics, China has about 290 million patients of cardiovascular diseases (The China Cardiovascular Disease Report 2013). If not effectively controlled and cured, hypertension may cause coronary atherosclerosis and lead to coronary heart disease and angina pectoris, and may also cause severe complications such as hypertensive heart disease and heart failure. In addition, long-term hypertension can cause damage to organs such as the kidney, brain, heart, and blood vessels.

As a severe manifestation or late stage of various heart diseases, addressing heart failure has been an important part of global chronic cardiovascular disease prevention and treatment, but the mortality rate and re-admission rate have stayed high. Epidemiological data from Europe and the U.S. show that the morbidity rate of heart failure in adults is 1.5% to 2.0%. Moreover, the mortality rate of heart failure also increases as people get older, with the population ≥70 years old having a mortality rate ≥10%. The China Epidemiological Survey in 2003 shows that the morbidity rate of heart failure in adults aged 35 to 74 years old in China was 0.9%. The China Cardiovascular Disease Report 2016 states that the morbidity rate of cardiovascular diseases in China is in a continuously rising phase, and the mortality rate of cardiovascular diseases is ranked No. 1 and is higher than those of tumors and other diseases. Population ageing is aggravated in China, and the morbidity rates of chronic diseases such as coronary heart disease, hypertension, diabetes, and obesity appear to have an ascending trend. Improved healthcare extends the survival of patients of cardiovascular diseases, causing the morbidity rate of heart failure in China to have a continuously ascending trend. A survey on 10,714 hospitalized patients of heart failure in China shows that the mortality rate of the patients of heart failure during hospitalization was 15.4%, 12.3%, and 6.2% in 1980, 1990, and 2000, respectively, and the primary causes of death were in an order of left-sided heart failure (59%), arrhythmia (13%), and sudden cardiac death (13%). The China-HF study shows that the mortality rate of the hospitalized patients of heart failure was 4.1%.

WO2007056546A1 disclosed LCZ96, a sodium salt complex of Valsartan and Sacubitril (AHU377) and a preparation method therefor. The sodium salt complex was approved for marketing in China in 2017 with a product name of ENTRESTO®, which is used for heart failure. The molecular structural unit thereof is as follows:

In addition, WO2017125031A1 discloses a series of complexes of an angiotensin receptor antagonist metabolite (EXP3174) and an NEP inhibitor (Sacubitril), which show certain effects on heart failure with preserved ejection fraction (HFpEF). The molecular structural unit thereof is as follows:

It is reported that EXP3174, the major active metabolite of losartan, in the kidney hypertension mouse models, cannot achieve the corresponding effectiveness of Losartan, and the low bioavailability restricts clinical applications of EXP3174. *Cardio Vasc Drug ReV,* 1997, Volume 15, No. 2, 122-136, doi: 10.1111/j.1527-3466.1997.tb00327.x However, it is critical to find an appropriate treatment method of the complex for hypertension or heart failure.

SUMMARY OF THE INVENTION

In view of the technical problems in the prior art, the present invention provides a treatment method of a complex of an angiotensin II receptor antagonist metabolite and an NEP inhibitor (or referred to as "supramolecular complex"), specifically a treatment method for hypertension or heart failure, comprising administering 60-500 mg of a complex of an angiotensin II receptor antagonist metabolite and an NEP inhibitor per day to a patient, and the structural unit of the complex is as follows:

(aEXP3174·bAHU377)·xCa·nA wherein a:b=1:0.25 to 4; x is a number between 0.5 and 3; A represents water, methanol, ethanol, 2-propanol, acetone, ethyl acetate, methyl tert-butyl ether, acetonitrile, toluene, or dichloromethane; and n is a number between 0 and 3.

A preferred technical solution of the present invention comprises administering 60, 120, 180, 240, 300, 360, 420, or 480 mg of the complex per day to a patient.

A preferred technical solution of the present invention comprises administering the complex once, twice, or three times per day to a patient.

As a preferred technical solution of the present invention, the treatment method for hypertension comprises administering 120, 240, or 480 mg of the complex per day to a patient and administering the complex once, twice, or three times per day to the patient; and the treatment method for heart failure comprises administering 60, 120, 240, or 480 mg of the complex per day to a patient and administering the complex once, twice, or three times per day to the patient.

The drug is a solid composition suitable for oral administration, preferably the composition is tablet or capsule, and it may be that a plurality of tablets and a plurality of capsules have a total drug amount of 60 mg and 500 mg.

As a preferred technical solution of the present invention, the hypertension is selected from primary hypertension, salt-sensitive hypertension, and the like, and the heart failure is selected from heart failure with preserved ejection fraction, heart failure with reduced ejection fraction, and the like.

As a preferred technical solution of the present invention, the drug refers to an application to a patient of heart failure with reduced ejection fraction, and the heart failure with reduced ejection fraction refers to HFrEF defined in Table 1: *Classification and Diagnosis Standard of Heart Failure in the China Guidelines for Heart Failure Diagnosis and Treatment* 2018.

As calculated according to experimental results and application quantities of prodrugs in the present invention, the single dose form of the drug refers to the drug that comprises the complex in an amount between about 60 mg and 500 mg as the total mass of (aEXP3174bAHU377), including but not limited to 60 mg, 70 mg, 80 mg, 90 mg, 100 mg, 110 mg, 120 mg, 130 mg, 140 mg, 150 mg, 160 mg, 170 mg, 180 mg, 190 mg, 200 mg, 210 mg, 220 mg, 230 mg, 240 mg, 250 mg, 260 mg, 270 mg, 280 mg, 290 mg, 300 mg, 310 mg, 320 mg, 330 mg, 340 mg, 350 mg, 360 mg, 370 mg, 380 mg, 390 mg, 400 mg, 410 mg, 420 mg, 430 mg, 440 mg, 450 mg, 460 mg, 470 mg, 480 mg, 490 mg, and 500 mg. As a more preferred technical solution of the present invention, the single dose form of the drug comprises 120, 180, 240, 300, 360, 420, or 480 mg of the complex. In one implementation, the single dose form refers to daily dose form in which a patient is administered with 100 mg/day to 500 mg/day of the complex, and the number of times of the administration includes, but is not limited to, once per day, twice per day, three times per day, four times per day, and the like.

As a preferred technical solution of the present invention, the drug refers to an application to a patient of salt-sensitive hypertension; and as calculated according to experimental results and application quantities of prodrugs in the present invention, the single dose form of the drug refers to the drug that comprises the complex in an amount between about 60 mg and 500 mg as the total mass of (aEXP3174·bAHU377), including but not limited to 60 mg, 70 mg, 80 mg, 90 mg, 100 mg, 110 mg, 120 mg, 130 mg, 140 mg, 150 mg, 160 mg, 170 mg, 180 mg, 190 mg, 200 mg, 210 mg, 220 mg, 230 mg, 240 mg, 250 mg, 260 mg, 270 mg, 280 mg, 290 mg, 300 mg, 310 mg, 320 mg, 330 mg, 340 mg, 350 mg, 360 mg, 370 mg, 380 mg, 390 mg, 400 mg, 410 mg, 420 mg, 430 mg, 440 mg, 450 mg, 460 mg, 470 mg, 480 mg, 490 mg, and 500 mg. As a more preferred technical solution of the present invention, the single dose form of the drug comprises 240, 300, 360, 420, or 480 mg of the complex. As a more preferred technical solution of the present invention, the single dose form refers to daily dose form in which a patient is administered with 200 mg/day to 500 mg/day of the complex, and the number of times of the administration includes, but is not limited to, once per day, twice per day, three times per day, four times per day, and the like.

Here, the molecular formula of EXP3174 is $C_{22}H_{21}ClN_6O_2$, and the molecular weight is about 436.9; and the molecular formula of AHU377 is $C_{24}H_{29}NO_5$, and the molecular weight is about 411.5. Therefore, the dose of the complex according to the present invention is calculated as anhydrous free acid $C_{46}H_5ClN_7O_7$.

The complex of the drug may be obtained using known methods in the prior art, wherein the complexes and the preparation method therefor disclosed by WO2017125031A1 are incorporated in the present invention.

As a more preferred technical solution of the present invention, the value of a:b is selected from 1:0.25, 1:0.5, 1:1, 1:1.5, 1:2, 1:2.5, 1:3, 1:3.5, and 1:4.

As a more preferred technical solution of the present invention, the structural unit of the complex is as follows:

or wherein x is a number between 0.5 and 2, and n is a number between 0 and 3.

As a more preferred technical solution of the present invention, x is selected from 0.5, 1, 1.5, and 2.

As a more preferred technical solution of the present invention, the structural unit of the complex is as follows:

or wherein n is any number between 1 and 3.

As a more preferred technical solution of the present invention, n is selected from 0.5, 1, 1.5, 2, 2.5, and 3.

As a more preferred technical solution of the present invention, the complex is selected from (EXP3174·AHU377)·2Ca·3H$_2$O.

A person skilled in the art should understand that the Allisartan metabolite (EXP3174), AHU377, calcium ion ($Ca^{2+}$), and solvent molecules fill, in the form of several structural units, unit cells of the supramolecular complex (the complex).

The supramolecular complex (the complex) according to the present invention is different from a mixture obtained through simple physical mixing of two active ingredients. In molecules of the complex, EXP3174, AHU377, and pharmaceutically acceptable calcium cations are combined through a non-covalent bond to obtain the supramolecular complex (the complex). The non-covalent bond is known to those skilled in the art, including but not limited to a hydrogen bond, a coordination bond, an ionic bond, and the like. The XRD spectrogram of the obtained supramolecular complex (the complex) is significantly different from XRD spectrograms of the EXP3174 and AHU377 calcium salt. In addition, the dissolution performance thereof also significantly differs in various solvents (such as water, ethanol, ethanol-water, and the like). Significant differences also exist in other various physicochemical properties, such as hygroscopicity, melting point, IR spectrogram, and the like.

Compared with the prior art, the present invention has the following advantages and beneficial effects:

1. As calculated according to the PK results, after the oral administration of 240 mg of the complex according to the present invention, the in vivo exposure of EXP3174 is not lower than the in vivo exposure of total active ingredients after oral administration of 100 mg Losartan, and the in vivo exposure of LBQ657 is not lower than the in vivo exposure of LBQ657 after oral administration of 200 mg LCZ696; after the oral administration of 480 mg of the complex according to the present invention, the in vivo exposure of EXP3174 is not lower than the in vivo exposure of total active ingredients after oral administration of 200 mg Losartan, and the in vivo exposure of LBQ657 is not lower than the in vivo exposure of LBQ657 after oral administration of 400 mg LCZ696.

2. From the statistical study on pharmacodynamics, it has been found that the increase of renin active concentration by the complex according to the present invention is significantly dose dependent, which achieves significant improvements relative to the placebo; in addition, the complex according to the present invention can significantly lower the NT-proBNP (brain natriuretic peptide) level relative to the placebo, indicating its inhibitory effect on NEP. It has been proved that the complex according to the present invention exhibits in vivo effects of lowering blood pressure and anti-heart failure.

3. As it is known in the prior art that direct oral administration of EXP3174 has a low bioavailability, the complex according to the present invention, as single molecules, has solved this technical problem and realized effective utilization of EXP3174.

DETAILED DESCRIPTION OF THE INVENTION

The present invention will be further described in detail below in combination with embodiments and the accompanying drawings, but implementations of the present invention are not limited thereto.

In the following embodiments:

X-ray powder diffraction was detected using an Empyrean X-ray diffractometer with the following detection conditions: Cu target Kα ray, voltage 40 KV, current 40 mA, emission slit ⅟₃₂°, anti-scatter slit ⅟₁₆°, anti-scatter slit 7.5 mm, 2θ range of 3° to 60°, step size 0.02°, and detention time 40 s per step.

Differential scanning calorimetry spectrograms were prepared from detection using a DSC204F1 differential scanning calorimeter (NETZSCH, Germany) with the following detection conditions: atmosphere: $N_2$, 20 mL/min; scanning procedure: heat at 10° C./min from room temperature to 250° C., and record the heating curve.

Water content was detected using a TG209 thermogravimetric analyzer (NETZSCH, Germany) with the following detection conditions: atmosphere: $N_2$, 20 mL/min; scanning procedure: room temperature to 700° C., and heating rate at 10° C./min.

The EXP3174 used in the embodiments was prepared by the company itself with a purity of 98.3%.

The AHU377 calcium salt used in the embodiments was prepared by the company itself with a purity of 99.4%.

Embodiment 1

Preparation of AHU377 Free Acid:

Add 2.1 g AHU377 calcium salt and 40 mL isopropyl acetate into a 250 mL single-necked flask, add 4.5 mL of 2 mol/L hydrochloric acid at room temperature, and stir until complete dissolution. Separate the liquid, collect the organic layer, and use 20 mL water to wash the organic layer twice; reduce pressure at 35° C. for precipitation to obtain AHU377 free acid.

Embodiment 2

Preparation of the Complex (Prepared According to Embodiment 2 of the Patent WO2017125031A1):

At room temperature, add 2.36 g of the AHU377 free acid obtained according to the method in Embodiment 1, 2 g EXP3174, and 40 mL acetone into a 250 mL three-necked flask, and dissolve until clear; at room temperature, add calcium hydroxide solid that is 1.3 equivalents of AHU377 and 1 mL water, stir at room temperature for 10 h, add another 40 mL acetone to further react for 8 h, perform suction filtration with a Buchner funnel under nitrogen protection, rinse the solid with acetone to obtain a white solid, bake the solid in vacuum at 35° C. for 8 h to dry, and obtain 3.5 g of a solid $(EXP3174 \cdot AHU377)^{3-} \cdot 1.5Ca^{2+} \cdot 2.5H_2O$ with a purity of 99% according to HPLC detection. Repeat the experiment to obtain a sufficient quantity for pharmacodynamic experiments.

Embodiment 3

Preparation of the Complex (Prepared According to Embodiment 3 of the Patent WO2017125031A1):

At room temperature, add 2.36 g of the AHU377 free acid obtained according to the method in Embodiment 1, 2 g EXP3174, and 40 mL acetone into a 250 mL three-necked flask, and dissolve until clear; at room temperature, add calcium hydroxide solid that is 1.6 equivalents of AHU377 and 0.6 mL water, stir at 35° C. for 6 h, add another 40 mL acetone to further react for 8 h, perform suction filtration with a Buchner funnel under nitrogen protection, rinse the solid with acetone to obtain a white solid, bake the solid in vacuum at 50° C. for 8 h to dry, and obtain 3.1 g of a solid $(EXP3174 \cdot AHU377)^{3-} \cdot 1.5Ca^{2+} \cdot 2H_2O$. Repeat the experiment to obtain a sufficient amount for pharmacodynamic experiments.

Embodiment 4

According to the preparation methods in Embodiments 2 and 3, respectively prepare the following complexes:

$(EXP3174 \cdot AHU377) \cdot 1.5Ca \cdot 1H_2O$;

$(EXP3174 \cdot AHU377) \cdot 1.5Ca \cdot 1.5H_2O$;

$(EXP3174 \cdot AHU377) \cdot 1.5Ca \cdot 3H_2O$;

$(EXP3174 \cdot AHU377) \cdot 2Ca \cdot 1H_2O$;

$(EXP3174 \cdot AHU377) \cdot 2Ca \cdot 1.5H_2O$;

$(EXP3174 \cdot AHU377) \cdot 2Ca \cdot 2H_2O$;

$(EXP3174 \cdot AHU377) \cdot 2Ca \cdot 2.5H_2O$;

$(EXP3174 \cdot AHU377) \cdot 2Ca \cdot 3H_2O$.

Embodiment 5

A pharmaceutical composition of the complex according to the present invention is made by mixing the complex in Embodiment 3 with a proper carrier, tableting using a powder direct compression process, and then coating, wherein each tablet has the following composition:

| Material name | Prescription amount mg/tablet |
| --- | --- |
| The complex in Embodiment 3 (as anhydrous free acid $C_{46}H_{50}ClN_7O_7$) | 60 |
| Microcrystalline cellulose | 80 |
| Anhydrous lactose | 20 |
| Low-substituted hydroxypropyl cellulose | 40 |
| Polyvinylpolypyrrolidone cross-linked XL | 20 |
| Silicon dioxide | 2.3 |
| Magnesium stearate | 2.3 |
| Film coating premix (gastric soluble), 295F640025-CN | 9.25 |
| Purified water | 61.67 |

Production process: perform powder mixing and direct compression on the above raw and supplementary materials other than the coating material and purified water, mix with the coating material and purified water, perform direct compression on the mixed coated powder to obtain tablets, thereby obtaining coated tablets.

Embodiment 6

Use the pharmaceutical composition from Embodiment 5 for Phase I clinical trials.

The complex tablet according to the present invention has completed single-center, randomized, double-blind, placebo-controlled Phase I clinical trials on tolerance of multi-dose single administration and multiple administration and pharmacokinetics among healthy subjects. A total of 7 dose groups, 60 mg, 180 mg, 360 mg, 540 mg, 720 mg, 960 mg, and 1080 mg, were set up for single administration; a total of 4 dose groups, 180 mg, 360 mg, 540 mg, and 720 mg were set up for multiple administration; the test of food impact was carried out on the 480 mg dose group, and urine samples and stool samples were collected during the first period of the test of food impact and used for studying the recovery rate and drug metabolic transformation; and therefore, the tolerance of single administration and multiple administration, pharmacokinetics, drug metabolic transformation, and recovery rate of the complex tablet according to the present invention among healthy subjects, as well as the impact of food on the pharmacokinetics thereof, were evaluated, and preliminary evaluation was performed on the pharmacodynamics.

Results from the Phase I clinical trials of the complex tablet according to the present invention show that, in a dose range of 60 to 1080 mg for single administration and 180 to 720 mg for multiple administration, the complex tablet according to the present invention has good pharmacokinetic characteristics, good tolerance, certain effects on the RAAS system and NEP enzyme of healthy subjects, and certain effects of lowering diastolic blood pressure and systolic blood pressure. The details are as follows:

6.1 Phase I Clinical Tolerance and Safety Results

The trial tests show that, in a dose range of 60 to 1080 mg for single administration and 180 to 720 mg for multiple administration, the complex tablet according to the present invention has good tolerance and is tolerated by all dose groups. No adverse events or severe adverse events at Grade III or above occurred, there were no adverse events that caused subjects to quit, and all the adverse events were Grade I or Grade II, were transient, and had no sequela after full recovery. No adverse events occurred after a single administration of 480 mg of the complex tablet according to the present invention in the fasting state or in a state after eating a high-fat meal, showing good safety.

6.2 Phase I Clinical Pharmacokinetics

Pharmacokinetics Analytical Method:

Perform analysis based on the PK parameter set (PKPS), use the software Phoenix WinNonlin8.1 to perform non-compartment model PK parameter analysis, calculate pharmacokinetic parameters of Sacubitril, LBQ657, and EXP3174 of each subject, and also calculate case number, mean, standard deviation, coefficient of variation, median, minimum, maximum, and geometric mean of each parameter. If a subject's $AUC_{Extra\ \%}$>20%, no descriptive statistical analysis was performed on $AUC_{0-\infty}$, $t_{1/2}$, $AUC_{Extra\ \%}$, $\lambda z$, $V_z/F$, $CL/F$, $AUC_{0-\infty,ss}$, $t_{1/2,ss}$, $V_z/F_{ss}$, and $MRT_{0-\infty,ss}$.

PK parameters for the single administration tests and food impact tests: $T_{max}$, $C_{max}$, $t_{1/2}$, $\lambda_z$, $AUC_{0-72}$, $AUC_{0-\infty}$, $V_z/F$, $CL/F$, and $AUC_{Extra\ \%}$.

PK parameters for the multiple administration tests: 1) PK parameters for the first administration: $T_{max}$, $C_{max}$, $t_{1/2}$, $AUC_{0-72}$, and $AUC_{0-\infty}$; 2) PK parameters for the last administration: $T_{max,ss}$, $C_{max,ss}$, $C_{min,ss}$, $C_{av,ss}$, $t_{1/2,ss}$, $\lambda_z$, $AUC_{0-72,ss}$, $AUC_{0-\infty,ss}$, $AUC_{0-\tau}$, $V_z/F_{ss}$, $CL/F_{ss}$, $MRT_{0-\infty,ss}$, $AUC_{Extra\ \%}$, $R_a(AUC)$, $R_a(C_{max})$, fluctuation index, and amplitude of fluctuation.

Use a power function model to study relationships between PK parameters in single administration ($C_{max}$, $AUC_{0-t}$, and $AUC_{0-\infty}$), PK parameters after the first administration of multiple administration ($C_{max}$, $AUC_{0-t}$, and $AUC_{0-\infty}$), and PK parameters after the last administration of multiple administration ($C_{max,ss}$, $AUC_{0-t,ss}$, and $AUC_{0-\infty,ss}$) and doses, and calculate the β value and 90% confidence interval thereof. At the same time, plot a diagram of proportional dose-effect relationship between the PK parameters and doses.

6.2.3 Statistical Analysis of the Data:

1) Comparison of EXP3174 Exposure

The in vivo EXP3174 exposure data in the Phase I clinical pharmacokinetics of the complex tablet according to the present invention are listed in Table 1 and Table 2 below:

TABLE 1

In vivo EXP3174 exposure data after single administration (SAD) of the complex according to the present invention (PKPS)

| Dose | *$AUC_{0-\infty}$ (hr*ng/mL) |
|---|---|
| 60 mg (n = 4) | 2362.42 |
| 180 mg (n = 8) | 5006.90 |
| 360 mg (n = 8) | 6952.43 |
| 540 mg (n = 7) | 14447.14 |
| 720 mg (n = 8) | 14711.92 |
| 960 mg (n = 8) | 15197.82 |
| 1080 mg (n = 7) | 19422.95 |

*The value of AUC here is arithmetic mean.

TABLE 2

In vivo EXP3174 exposure data in the steady state after multiple administration (MAD) of the complex according to the present invention (PKPS)

| Dose | *$AUC_{0-\tau}$ (hr*ng/mL) |
|---|---|
| 180 mg (n = 10) | 4705.47 |
| 360 mg (n = 10) | 8065.39 |
| 540 mg (n = 10) | 12972.77 |
| 720 mg (n = 10) | 13992.58 |

*The value of AUC here is arithmetic mean.

After entering the human body, Losartan (with the product name of Cozaar®) may be oxidized by metabolic enzymes CYP3A4 and CYP2C9 to the active metabolite EXP3174. It is reported in literature that the latter has a firmer bonding with the AT1 receptor, with a dissociation constant being about 5 times of that of the prototype drug of the former, and the two have a joint pharmaceutical effect in vivo.

(see "2012 Review Summary of Allisartan Tablet (CXHS10000101-102), http://www.cde.org.cn/reviewDe.do?method=showFAQ&id=2.").

Clinical data have shown that after the single oral administration of Losartan to healthy subjects, the in vivo EXP3174 exposure (AUC) is about four times of that of the prototype drug.

(see "COZAAR® label. Reference ID: 4334171, https://www.accessdata.fda.gov/drugsatfda_docs/label/2018/020386s0621b1.pdf.").

The study by Tamaki et al. shows that EXP3174 and Losartan have similar molar masses (according to the analysis of chemical structures, the two differ only by 14 in molecular weight), and the in vitro activity of EXP3174 is far better than that of Losartan.

(see the reference: Tamaki T, Nishiyama A, Kimura S, et al. EXP3174: The Major Active Metabolite of Losartan[J]. cardiovascular therapeutics, 1997, 15(2): 122-136.").

Without considering the difference of the two in therapeutic effect, it can be assumed that the in vivo therapeutic effect of the total active ingredients of Losartan is similar to that of EXP3174, and then, the exposure of total active ingredients after oral administration of Losartan is about the sum of exposures of the Losartan prototype and EXP3174 (the total active ingredients=Losartan+EXP3174). The exposure of total active ingredients of Losartan is calculated as shown in Table 3 below:

TABLE 3

Data of in vivo Losartan and EXP3174 exposure
after single administration (SAD) of Losartan$

| Dose | *AUC (hr*ng/mL) | | |
|---|---|---|---|
| | Losartan | EXP3174 | **total active ingredients |
| 40 mg (n = 15) | 391.5 | #1720.8 | 2112.3 |
| 80 mg (n = 8) | 932.7 | 3639.3 | 4572.0 |
| 120 mg (n = 8) | 1277.7 | 5333.7 | 6611.4 |
| 150 mg (n = 8) | 1678.0 | 6806.9 | 8484.9 |
| 200 mg (n = 15) | 2371.6 | 8118.6 | 10490.2 |
| 250 mg (n = 7) | 2567.3 | 9057.8 | 11625.1 |
| 300 mg (n = 7) | 3492.4 | 10546.6 | 14039.0 |
| 50 mg (n = 12) | 395.0 | 1787.1 | 2182.1 |

*The value of AUC here is arithmetic mean.
**The total active ingredients = Losartan + EXP3174,
n = 4,
$Data source: the Losartan FDA report, Apr. 4, 1995.

It is known that the complex according to the present invention is a complex of EXP3174 and Sacubitril, and after entering the human body, only EXP3174 has the pharmaceutical effect of ARBs. Therefore, from the comparison of the in vivo EXP3174 exposure after the oral administration of the complex according to the present invention and the in vivo exposure of the total active ingredients after the oral administration of Losartan, it can be seen that 60 mg of the complex according to the present invention is not lower than 50 mg Losartan; 180 mg of the complex according to the present invention is not lower than 80 mg Losartan; 360 mg of the complex according to the present invention is not lower than 150 mg Losartan; and 540 mg of the complex according to the present invention is significantly greater than 200 mg Losartan and not lower than 300 mg Losartan.

Common clinical doses of Losartan are 50 mg and 100 mg, and doses of the complex according to the present invention to be marketed are 240 mg and 480 mg. In combination of the above data, it can be calculated that, after oral administration of 240 mg of the complex according to the present invention, the in vivo EXP3174 exposure is not lower than the in vivo exposure of total active ingredients after oral administration of 100 mg Losartan; and after oral administration of 480 mg of the complex according to the present invention, the in vivo EXP3174 exposure is not lower than the in vivo exposure of total active ingredients after oral administration of 200 mg Losartan.

2) Comparison of LBQ657 Exposure

The in vivo LBQ657 (Cas #149709-44-4) exposure data in the Phase I clinical pharmacokinetics of the complex tablet according to the present invention are listed in Table 4 and Table 5 below:

TABLE 4

In vivo LBQ657 exposure data after single administration (SAD)
of the complex according to the present invention (PKPS)

| Dose | *AUC$_{0-\infty}$ (hr*ng/mL) |
|---|---|
| 60 mg (n = 4) | 24458.41 |
| 180 mg (n = 8) | 81058.43 |
| 360 mg (n = 8) | 122368.04 |
| 540 mg (n = 7) | 238970.22 |
| 720 mg (n = 8) | 284281.16 |
| 960 mg (n = 8) | 344564.58 |
| 1080 mg (n = 7) | 381183.70 |

*The value of AUC here is arithmetic mean.

TABLE 5

In vivo LBQ657 exposure data in the steady state
after multiple administration (MAD) of the complex
according to the present invention (PKPS)

| Dose | *AUC$_{0-\tau}$ (hr*ng/mL) |
|---|---|
| 180 mg (n = 10) | 84849.12 |
| 360 mg (n = 10) | 135034.80 |
| 540 mg (n = 10) | 202626.78 |
| 720 mg (n = 10) | 274292.35 |

*The value of AUC here is arithmetic mean.

Sacubitril Valsartan sodium tablets (LCZ696, product name Entresto®) are rapidly absorbed inside healthy subjects and produces LBQ657 (obtained through enzymatic lysis of AHU377) and systemic exposure of Valsartan (see ENTRESTO® label. Reference ID: 4499982, https://www.accessdata.fda.gov/drugsatfda_docs/label/2019/207620s0131b1.pdf"). After single administration, the in vivo systemic exposure of LBQ657 in healthy bodies in China is show in Table 6.

TABLE 6

In vivo LBQ657 exposure data after single administration
(SAD) of Sacubitril Valsartan Sodium Tablet (PKPS)

| Dose | *AUC$_{0-\infty}$ (hr*ng/mL) |
|---|---|
| 50 mg (n = 10) | 21400 |
| 100 mg (n = 10) | 44400 |
| 200 mg (n = 10) | 87100 |
| 400 mg (n = 10) | 164000 |

Data source: see the reference, "Han Y, et al. Pharmacokinetics, Safety and Tolerability of Sacubitril/Valsartan (LCZ696) After Single-Dose Administration in Healthy Chinese Subjects[J]. European Journal of Drug Metabolism & Pharmacokinetics, 2017, 42(1): 109-116. DOI: 10.1007/s13318-016-0328-3."
*The value of AUC here is arithmetic mean.

It is known that the complex according to the present invention is a complex of EXP3174 and Sacubitril, and after entering the human body, Sacubitril becomes LBQ657 (an active metabolite of the prodrug Sacubitril) after enzymatic metabolism. Therefore, from the comparison of the in vivo LBQ657 exposure after the oral administration of the complex according to the present invention and the in vivo LBQ657 exposure after the oral administration of LCZ696, it can be seen that 60 mg of the complex according to the present invention is not lower than 50 mg LCZ696; 180 mg of the complex according to the present invention is significantly greater than 100 mg LCZ696; 360 mg of the complex according to the present invention is significantly greater than 200 mg LCZ696; and 540 mg of the complex according to the present invention is significantly greater than 400 mg LCZ696.

Clinical doses of LCZ696 are 100 mg, 200 mg, and 400 mg, and doses of the complex according to the present invention to be marketed are 240 mg and 480 mg. In combination of the above data, it can be calculated that, after oral administration of 240 mg of the complex according to the present invention, the in vivo LBQ657 exposure is not lower than the in vivo LBQ657 exposure after oral administration of 200 mg LCZ696; and after oral administration of 480 mg of the complex according to the present invention, the in vivo LBQ657 exposure is not lower than the in vivo LBQ657 exposure after oral administration of 400 mg LCZ696.

3) Summary

According to the PK results of the single administration and multiple administration, it is calculated that, after oral administration of 240 mg of the complex according to the present invention, the in vivo EXP3174 exposure is not lower than the in vivo exposure of total active ingredients after oral administration of 100 mg Losartan, and the in vivo exposure of LBQ657 is not lower than the in vivo exposure of LBQ657 after oral administration of 200 mg LCZ696; after the oral administration of 480 mg of the complex according to the present invention, the in vivo exposure of EXP3174 is not lower than the in vivo exposure of total active ingredients after oral administration of 200 mg Losartan, and the in vivo exposure of LBQ657 is not lower than the in vivo exposure of LBQ657 after oral administration of 400 mg LCZ696.

In summary, the preferably obtained treatment method for hypertension comprises administering 120, 240, or 480 mg of the complex per day to a patient and administering the complex once, twice, or three times per day to the patient; and the treatment method for heart failure comprises administering 60, 120, 240, or 480 mg of the complex per day to a patient and administering the complex once, twice, or three times per day to the patient.

6.3 Phase I Clinical Pharmacodynamics

Analytical Method for Phase I Clinical Pharmacodynamics

Perform analysis based on the pharmacodynamic analysis data set (PDPS), and use the statistical analysis software SAS9.4 to perform analysis.

The renin activity and NT-proBNP indexes are analyzed as follows:

1) Perform statistical description on change percentage of each time point of Day 7 and Day 10 relative to the baseline, and calculate case number, mean, standard deviation, median, minimum, maximum, and quartiles Q1 and Q3 of the percentages.
2) Calculate the baseline and change percentage of geometric means of all the dose groups and the geometric mean of the placebo group at each time point of Day 7 and Day 10.
3) Calculate ratios of geometric means of all the dose groups to the geometric mean of the placebo group at each time point of Day 7 and Day 10, and 95% confidence interval thereof.
4) Calculate ratios of the geometric mean at each time point of Day 7 and Day 10 to the geometric mean of the baseline, and 95% confidence interval thereof.
5) Calculate the $T_{max}$ value of the renin activity index on Day 7 and Day 10 after drug administration.
6) Calculate the $T_{min}$ value of the NT-proBNP index on Day 7 and Day 10 after drug administration.
7) Plot a diagram of average concentration-time curves of Day 7 and Day 10 according to scheduled sampling time points.

Change percentage (%) relative to the baseline=(specific accessed value−baseline value)/baseline value×100%.

Change percentage (%) of GM (geometric mean) of each dose group relative to the GM of the placebo group=(GM of each dose group−GM of the placebo group)/GM of the placebo group× 100%.

Blood pressure and pulse: perform statistical description on changes at each time point of Day 10 relative to the baseline, calculate case number, mean, standard deviation, median, minimum, maximum, and quartiles Q1 and Q3, and summarize in a table.

The indexes include: renin activity and N-terminal B-type natriuretic peptide precursor (NT-proBNP), which were only collected in the multiple administration tests.

Test results are as follows:

Renin Activity

The 180, 360, and 540 mg dose groups are all significantly greater than the baseline after drug administration, and reach the maximum effect at about 4 h.

Figure 1:
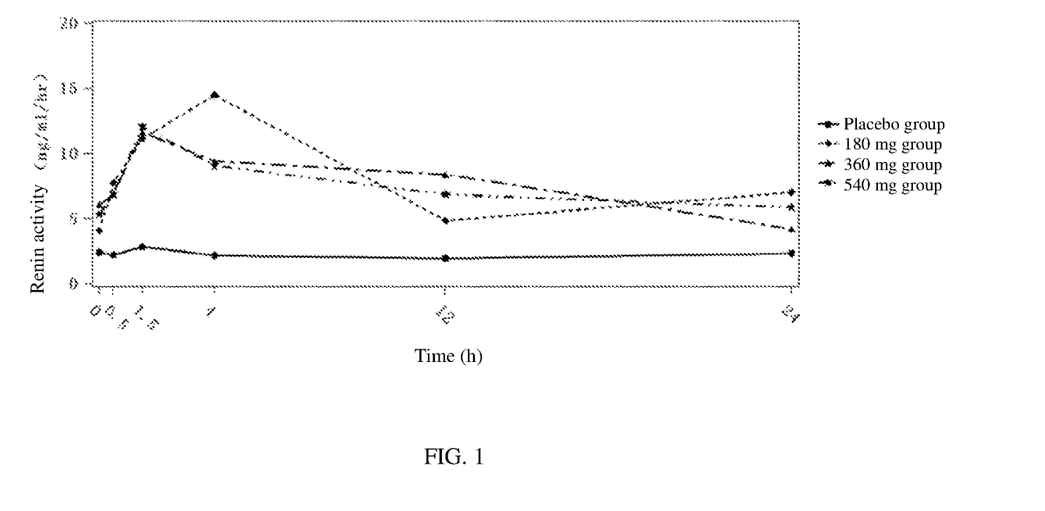
FIG. 1 is a schematic diagram of average concentration-time curves of the renin activity (PDPS, N=48) on Day 10.

Results: in the dose range of 180 to 540 mg of multiple administration, the geometric mean of the renin activity of the complex tablet according to the present invention at each time point of Day 10 after drug administration is significantly higher than the baseline. The results of the renin activity are shown in FIG. 1, indicating that the complex tablet according to the present invention has certain inhibitory effects on the RAAS system of healthy subjects.

NT-proBNP

The 180, 360, and 540 mg dose groups are all significantly lower than the baseline after drug administration, and reach the maximum effect at about 4 h.

Figure 2:
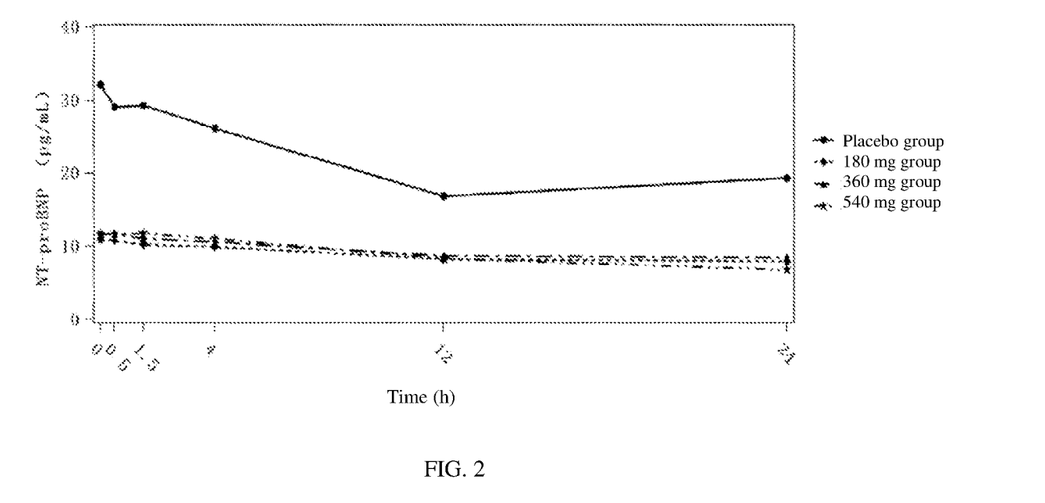
FIG. 2 is a schematic diagram of average concentration-time curves of the NT-proBNP index (PDPS, N=48) on Day 10.

Results: in the dose range of 180 to 540 mg of multiple administration, the geometric mean of NT-proBNP is always lower than the baseline. The NT-proBNP results are specifically shown in FIG. 2, indicating that the complex tablet according to the present invention has certain inhibitory effects on the NEP enzyme of healthy subjects.

By combining the research data of pharmacodynamics of the multiple administration, the PK research results, and clinically effective doses of LCZ696, it is estimated that the clinical pharmacodynamic dose is 60 mg to 480 mg.

Embodiment 7 This Experiment is a Randomized, Double-Blind, Parallel, Placebo- and Positive Drug-Controlled, Multi-Centered, Phase II Clinical Study Primary objective: with the placebo as the control, study the effectiveness and safety of the tablets having the complex prescription in Embodiment 5 in treating light and medium primary hypertension at different doses, and provide a basis for Phase III clinical trials; and Secondary objective: with Olmesartan Medoxomil tablets as the positive control drug, perform preliminary comparison of therapeutic effects of the tablets having the complex prescription in Embodiment 5 at different doses and of Olmesartan Medoxomil tablets.

It is scheduled to include 216 cases, who are patients aged ≥18-years old and ≤75-years old and having light and medium primary hypertension without target organ complications.

After screening, the qualified subjects first enter a 2-week cleaning period; after the 2-week cleaning period is ended, subjects who meet the selection standards enter a 2-week introduction period; after the 2-week introduction period is ended, subjects who still meet the selection standards enter an 8-week double-blind treatment period, and the subjects are randomly allocated, at a ratio of 2:2:2:2:1, to a group of 120 mg of the complex tablet according to the present invention, a group of 240 mg of the complex tablet according to the present invention, a group of 480 mg of the complex tablet according to the present invention, a positive control group (20 mg Olmesartan Medoxomil tablets), and a placebo group.

Primary therapeutic effect evaluation index changes of mean sitting systolic blood pressure (msSBP) at the end of Week 8 relative to the baseline.

Secondary therapeutic effect evaluation indexes:
1) Changes of mean sitting diastolic blood pressure (msDBP) at the end of Week 8 relative to the baseline;
2) Changes of mean arterial pressure (MAP) at the end of Week 8 relative to the baseline;
3) Pressure-lowering effective rate at the end of Week 8: the percent of the number of subjects with effectively lowered pressure in each group of the total number of subjects in said group. A therapeutically effective case refers to a patient whose blood pressure becomes normal (systolic/diastolic blood pressure <140/90 mmHg) or whose systolic blood pressure is lowered by >20 mmHg than the baseline and/or whose diastolic blood pressure is lowered by >10 mmHg than the baseline;
4) Pressure-lowering target rate at the end of Week 8: the percent of the number of subjects who meet the treatment target in each group of the total number of subjects in said group. A case who meets the treatment target means that the blood pressure becomes normal (systolic/diastolic blood pressure <140/90 mmHg); and
5) 24 h ambulatory blood pressure monitoring (ABPM): the trough/peak ratio (T/P) of systolic blood pressure and diastolic blood pressure at the end of Week 8; 24 h changes of average systolic blood pressure and diastolic blood pressure at the end of Week 8 relative to the baseline; and changes of average systolic blood pressure and diastolic blood pressure at the end of Week 8 relative to the baseline during day (6:00 am to 22:00 pm) and night (22:00 pm to 6:00 am of next day).

The above embodiments are preferred implementations of the present invention, but the implementations of the present invention are not limited to the above embodiments. Any other changes, modifications, substitutions, combinations, and simplifications made without departing from the spirit, essence, and principle of the present invention shall be encompassed, as equivalent replacements, in the scope of protection of the present invention.

The invention claimed is:

1. A method for treating hypertension or heart failure, the method comprising administering 180-500 mg per day of a complex of an angiotensin II receptor antagonist metabolite and an NEP inhibitor to a patient, and the structural unit of the complex being as follows:

(aEXP3174·bAHU377)·xCa·nA wherein a:b=1:0.25 to 4; x is a number between 0.5 and 3; A represents water; and n is a number between 0 and 3.

2. The method according to claim 1, comprising administering 180, 240, 300, 360, 420, or 480 mg of the complex per day to the patient.

3. The method according to claim 1, comprising administering the complex once, twice, or three times per day to the patient.

4. The method according to claim 1, wherein the method is for treating hypertension, and wherein the method comprises administering 120, 240, or 480 mg of the complex once, twice, or three times per day.

5. The method according to claim 1, wherein the complex is in a solid composition suitable for oral administration.

6. The method according to claim 1, wherein the value of a:b is selected from the group consisting of 1:0.25, 1:0.5, 1:1, 1:1.5, 1:2, 1:2.5, 1:3, 1:3.5, and 1:4.

7. The method according to claim 1, wherein the structural unit of the complex is as follows:

(EXP3174·AHU377)·xCa·nH$_2$O or wherein x is a number between 0.5 and 2, and n is a number between 0 and 3.

8. The method according to claim 1, wherein x is selected from the group consisting of 0.5, 1, 1.5, and 2.

9. The method according to claim 1, wherein the structural unit of the complex is as follows:

(EXP3174·AHU377)·1.5Ca·nH$_2$O or (EXP3174·AHU377)·2Ca·nH$_2$O wherein n is any number between 1 and 3.

10. The method according to claim 1, wherein n is selected from 0.5, 1, 1.5, 2, 2.5, and 3.

11. The method according to claim 1, wherein the complex is selected from:

(EXP3174·AHU377)·1.5Ca·1H$_2$O (EXP3174·AHU377)·1.5Ca·1.5H$_2$O (EXP3174·AHU377)·1.5Ca·2H$_2$O (EXP3174·AHU377)·1.5Ca·2.5H$_2$O (EXP3174·AHU377)·1.5Ca·3H$_2$O (EXP3174·AHU377)·2Ca·1H$_2$O (EXP3174·AHU377)·2Ca·1.5H$_2$O (EXP3174·AHU377)·2Ca·2H$_2$O (EXP3174·AHU377)·2Ca·2.5H$_2$O (EXP3174·AHU377)·2Ca·3H$_2$O.

12. The method according to claim 1, wherein the method is for treating heart failure, and wherein the method comprises administering 120, 240, or 480 mg of the complex once, twice, or three times per day to the patient.

13. The method according to claim 5, wherein the solid composition is a tablet or capsule.

* * * * *

UNITED STATES PATENT AND TRADEMARK OFFICE
CERTIFICATE OF CORRECTION

| | | |
|---|---|---|
| PATENT NO. | : 12,453,719 B2 | Page 1 of 1 |
| APPLICATION NO. | : 17/615013 | |
| DATED | : October 28, 2025 | |
| INVENTOR(S) | : Jingchao Sun et al. | |

It is certified that error appears in the above-identified patent and that said Letters Patent is hereby corrected as shown below:

In the Claims

Column 20, Line 13 Claim 4, which currently reads as:
"once, twice, or three times per day."
To read:
--once, twice, or three times per day to the patient.--

Signed and Sealed this
Second Day of December, 2025

John A. Squires
*Director of the United States Patent and Trademark Office*